United States Patent
Yamamoto

(10) Patent No.: US 9,573,055 B2
(45) Date of Patent: Feb. 21, 2017

(54) GAME MACHINE, METHOD AND NON-TRANSITORY COMPUTER READABLE STORAGE MEDIUM FOR A MUSIC GAME IN WHICH TOUCH OPERATIONS ARE EVALUATED

(71) Applicant: Konami Digital Entertainment Co., Ltd., Minato-ku, Tokyo (JP)

(72) Inventor: Takao Yamamoto, Minato-ku (JP)

(73) Assignee: KONAMI DIGITAL ENTERTAINMENT CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/739,238

(22) Filed: Jun. 15, 2015

(65) Prior Publication Data

US 2015/0273324 A1 Oct. 1, 2015

Related U.S. Application Data

(63) Continuation of application No. PCT/JP2013/083456, filed on Dec. 13, 2013.

(30) Foreign Application Priority Data

Dec. 25, 2012 (JP) ................................ 2012-280893

(51) Int. Cl.
 *A63F 9/24* (2006.01)
 *A63F 13/218* (2014.01)
 (Continued)

(52) U.S. Cl.
 CPC ............. *A63F 13/218* (2014.09); *A63F 13/06* (2013.01); *A63F 13/10* (2013.01); *A63F 13/213* (2014.09);
 (Continued)

(58) Field of Classification Search
 None
 See application file for complete search history.

(56) References Cited

U.S. PATENT DOCUMENTS

| 6,645,067 B1 * | 11/2003 | Okita ................... A63F 13/005 434/307 A |
| 2001/0016511 A1 * | 8/2001 | Hino ....................... A63F 13/10 463/8 |

(Continued)

FOREIGN PATENT DOCUMENTS

| JP | 2010-233957 A | 10/2010 | |
| JP | 2010233957 | * 10/2010 | ............. A63F 13/10 |
| JP | 4971533 B2 | 7/2012 | |
| KR | 1020120130225 | 11/2012 | |

OTHER PUBLICATIONS

International Search Report; PCT/JP2013/083456; Date of Mailing: Mar. 18, 2014.

*Primary Examiner* — Jason Yen
(74) *Attorney, Agent, or Firm* — Howard & Howard Attorneys PLLC

(57) ABSTRACT

Provided is a game machine that can enhance the level of difficulty of a game. The game machine provides a music game in which touch operations are evaluated. Moreover, the game machine comprises a touch panel that, when a plurality of locations within a game region are touch operated, detects the positions of this plurality of touch operations. On the basis of the result of detection by the touch panel, the game machine acquires a particular position that is different from all the plurality of touch operation positions by using this plurality of touch operation positions as reference, and, on the basis of the result of this acquisition, evaluates the particular position as an evaluation of the plurality of touch operations.

12 Claims, 8 Drawing Sheets

(51) Int. Cl.
   *A63F 13/20*     (2014.01)
   *A63F 13/40*     (2014.01)
   *G07F 17/32*     (2006.01)
   *A63F 13/67*     (2014.01)
   *A63F 13/213*    (2014.01)
   *A63F 13/426*    (2014.01)
   *A63F 13/2145*   (2014.01)

(52) U.S. Cl.
   CPC ......... *A63F 13/2145* (2014.09); *A63F 13/426* (2014.09); *A63F 13/67* (2014.09); *G07F 17/3209* (2013.01); *G07F 17/3295* (2013.01); *A63F 2300/1075* (2013.01); *A63F 2300/6045* (2013.01); *A63F 2300/8047* (2013.01)

(56) References Cited

U.S. PATENT DOCUMENTS

| | | | |
|---|---|---|---|
| 2005/0085284 A1* | 4/2005 | Onoda | A63F 13/10 463/7 |
| 2006/0009979 A1* | 1/2006 | McHale | A63F 13/10 704/270 |
| 2006/0287088 A1* | 12/2006 | Mashimo | A63F 13/10 463/37 |
| 2008/0146312 A1* | 6/2008 | Yamazaki | A63F 13/10 463/20 |
| 2011/0077077 A1* | 3/2011 | Tsubakisawa | G10H 1/0016 463/30 |
| 2013/0005463 A1 | 1/2013 | Yamamoto | |
| 2013/0012314 A1* | 1/2013 | Ishikawa | A63F 13/428 463/31 |
| 2013/0040733 A1 | 2/2013 | Yamamoto et al. | |

\* cited by examiner

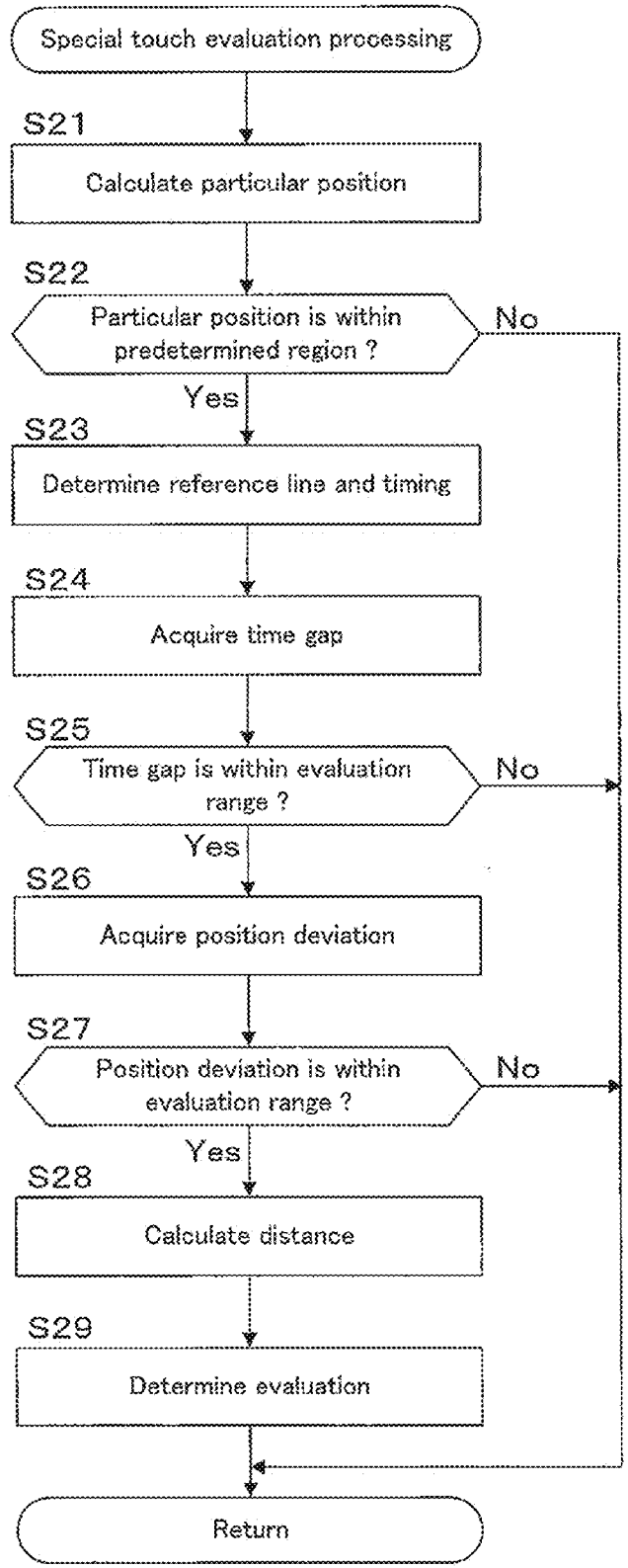

GAME MACHINE, METHOD AND NON-TRANSITORY COMPUTER READABLE STORAGE MEDIUM FOR A MUSIC GAME IN WHICH TOUCH OPERATIONS ARE EVALUATED

CROSS-REFERENCE TO RELATED APPLICATION

This application is a continuation of PCT Application No. PCT/JP2013/083456, filed Dec. 13, 2013, which claims priority to Japanese Patent Application No. 2012-280893, filed Dec. 25, 2012, the disclosures of which are hereby incorporated by reference in their entirety.

TECHNICAL FIELD

The present invention relates to a game machine that provides a game in which a predetermined play action is evaluated, and to a control method and a non-transitory computer readable storage medium that are employed thereupon.

BACKGROUND ART

Game machines that provide games that evaluate a predetermined play action are per se known. And, as one such game, a game system is per se known that provides a competitive style music game in which the timings at which touch operations are to be performed as play actions are shown via an object (for example, refer to Patent Document #1).

CITATION LIST

Patent Literature

Patent Document #1: Japanese Patent Publication 4,971,533.

SUMMARY OF INVENTION

Technical Problem

With the game system of Patent Document #1, touch operation is detected via a touch panel, and the position and the timing of this touch operation are evaluated. And, with the game system of Patent Document #1, touch operation upon the object, in other words the operation of touching the object itself, is evaluated. That is, the position for the touch operation that is to be evaluated is made clear by the object. As a result, the player is able simply and easily to recognize the position at which touch operation is to be performed. Accordingly the level of difficulty of the game is low, as compared to a case in which the position at which touch operation is to be performed is not clear.

Thus, the object of the present invention is to provide a game machine that is capable of enhancing the level of difficulty of a game, and to provide a control method and a non-transitory computer readable storage medium that are employed thereupon.

Solution to Technical Problem

The game machine according to the present invention is a game machine that provides a game in which a predetermined play action is evaluated, and wherein the game machine comprises: a specified position detection device configured to, when a plurality of positions within a predetermined range have been specified as the predetermined play action, detect the plurality of specified positions that have been specified by the play action; a particular position acquisition device configured to, on the basis of the results detected by the specified position detection device, acquire a particular position that is different from all of the plurality of specified positions by using the plurality of specified positions as reference; and a position evaluation device configured to, on the basis of the result of acquisition by the particular position acquisition device, evaluate the particular position as the predetermined play action.

According to the present invention, a plurality of specified positions is detected as a predetermined play action. And a particular position that is different from the plurality of specified positions is evaluated. In other words, a position that is different from the positions that have actually been specified by the player is evaluated. Due to this, the correspondence between the play action and the result of evaluation is not so clear, as compared with the case in which a specified position itself is evaluated. Accordingly, the player must play the game while taking into consideration the correspondence between his own play action and the particular position that is the subject of evaluation. Due to this, it is possible to enhance the level of difficulty of the game, as compared with the case in which a specified position itself is evaluated. As a result, it is possible to enhance the level of interest of the game without implementing any changes to the details of the game.

And, according to one aspect of the game machine of the present invention, in the game, when the particular position is evaluated by the position evaluation device, evaluation for the plurality of specified positions may be not performed. In this case, it is possible to provide a game in which only the particular position is evaluated. In other words, it is possible to provide a game whose level of difficulty is higher, as compared with the case in which a plurality of specified positions is evaluated.

Moreover, according to one aspect of the game machine of the present invention, a normal play action in which one position within the predetermined range is specified, and a special play action in which the plurality of positions are specified, may be included in the predetermined play action; and the position evaluation device may evaluate either one of the one position and the particular position by evaluating the one position when the normal play action has been performed, while by evaluating the particular position instead of evaluating the one position when the special play action has been performed. In this case, it is possible to provide a game in which it is possible to utilize either the normal play action or the special play action, as appropriate. Furthermore in this aspect, in the game, the normal play action and the special play action may be specified by aspects that can be mutually distinguished. In this case, it is possible to specify the appropriate division between the normal play action and the special play action. Accordingly, it is also possible to evaluate this division.

Furthermore, according to one aspect of the game machine of the present invention, the position evaluation device may evaluate the particular position so that the higher its evaluation becomes, the longer the distance of a straight line which is acquired by the plurality of specified positions is. If a plurality of positions is specified, it is often the case that intentional specification becomes more difficult, the greater is the mutual distance by which they are separated from one another. Accordingly, in this case, it is possible to reflect the difficulty of this intentional specification in the evaluation.

The game machine of the present invention may supply games of various types. For example, as one aspect of the game machine of the present invention, as the game, a game may be employed that teaches reference timings to the player by, based upon reference timing data in which the reference timings at which the predetermined play actions are to be executed are described, arranging indication marks corresponding to the reference timings and a reference mark corresponding to the present time in order of time along a predetermined path, and by generating relative displacement along the predetermined path between the indication marks and the reference mark according to the passage of time, so that the indication marks agree with the reference mark at the reference timings to be shown by the indication marks. Moreover, in this aspect, the game may be constructed so that a reference portion, at which the indication mark shifting within the game region in which the plurality of reference portions are arranged with mutual gaps being opened between them so as to arrive at least at one of the plurality of the reference portions at the reference timing that corresponds to the indication mark has arrived, functions as the reference mark, and the shifting path of the indication mark going to the next reference portion changes according to the play action; and the relative displacement may be generated by the indication mark shifting towards the reference marks. Furthermore, in these aspects, the position evaluation device may evaluate the particular position by taking the position of the indication mark as reference, and also evaluate the timing at which the play action has been executed on the basis of the reference timing data.

As one aspect of the present invention in which the timings at which the predetermined play actions are shown by using such an indication mark and such reference marks, there may be further provided an audio output device configured to reproduce and output music, and a music reproduction device configured to reproduce the music from the audio output device on the basis of music data for reproducing the music; and wherein timings within the music are used as the reference timings. In this case, the game machine may provide a music game. And it is possible to enhance the level of difficulty of this music game.

The control method of the present invention is a control method of controlling a computer which is incorporated into a game machine that provides a game in which a predetermined play action is evaluated and comprises a specified position detection device configured to, when a plurality of positions within a predetermined range have been specified as the predetermined play action, detect the plurality of specified positions that have been specified by the play action, and wherein the control method comprises: a particular position acquisition step that, on the basis of the results detected by the specified position detection device, acquires a particular position that is different from all of the plurality of specified positions by using the plurality of specified positions as reference; and a position evaluation step that, on the basis of the result of acquisition by the particular position acquisition step, evaluates the particular position as the predetermined play action.

And a non-transitory computer readable storage medium of the present invention is a non-transitory computer readable storage medium storing a computer program for a game machine that provides a game in which a predetermined play action is evaluated and comprises a specified position detection device configured to, when a plurality of positions within a predetermined range have been specified as the predetermined play action, detect the plurality of specified positions that have been specified by the play action, and wherein the computer program for the game machine is configured so as to cause a computer which is incorporated into the game machine, to function as; a particular position acquisition device configured to, on the basis of the results detected by the specified position detection device, acquire a particular position that is different from all of the plurality of specified positions by using the plurality of specified positions as reference, and a position evaluation device configured to, on the basis of the result of acquisition by the particular position acquisition device, evaluate the particular position as the predetermined play action. It is possible to implement the game machine of the present invention by executing the control method or the computer program of the non-transitory computer readable storage medium of the present invention.

Advantageous Effects of Invention

As explained above, according to the present invention, it is possible to enhance the level of difficulty of the game.

BRIEF DESCRIPTION OF DRAWINGS

FIG. 9 is a figure showing an example of a flow chart for a special touch evaluation processing routine.

DESCRIPTION OF EMBODIMENTS

Figure 1:
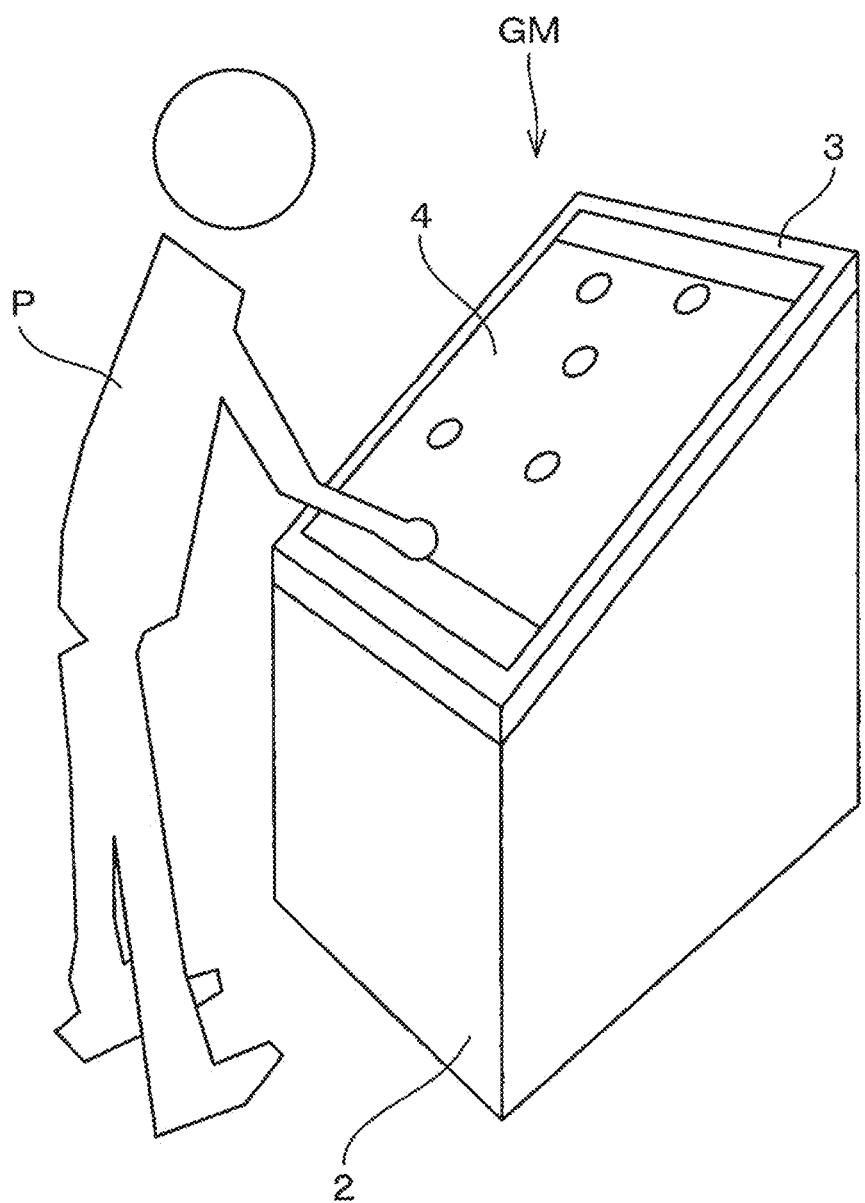
FIG. 1 is a figure showing the external appearance of a game machine according to an embodiment of the present invention.

In the following, a game machine according to an embodiment of the present invention will be explained. FIG. 1 is a figure showing the external appearance of a game machine GM according to an embodiment of the present invention. This game machine GM is a game machine for business use (i.e. for commercial use) that, in exchange for a predetermined payment, provides a music game over a range corresponding to that payment. A music game is a game in which the player is requested to perform predetermined play actions in time with the rhythm of music. As shown in FIG. 1, the game machine GM comprises a casing 2. A monitor 3 is disposed upon the upper surface of the casing 2, so that it is tilted towards a player P. A transparent touch panel 4 serving as a specified position detection device is superimposed upon the front surface of the monitor 3. This touch panel 4 is a per se known input device that, when the player P touches it with his finger or the like, outputs a signal corresponding to the position of this contact. Moreover by employing, for example, an infra-red sensor or the like, the touch panel 4 is adapted to be capable of detecting touch operation at a plurality of positions. Apart from the above, the game machine GM is also provided with other input devices and output devices of various types such are usually provided to a conventional game machine for business use, such as selection and confirmation buttons, a power supply switch, a volume control, a power supply light and so on, but these are not shown in FIG. 1.

Figure 2:
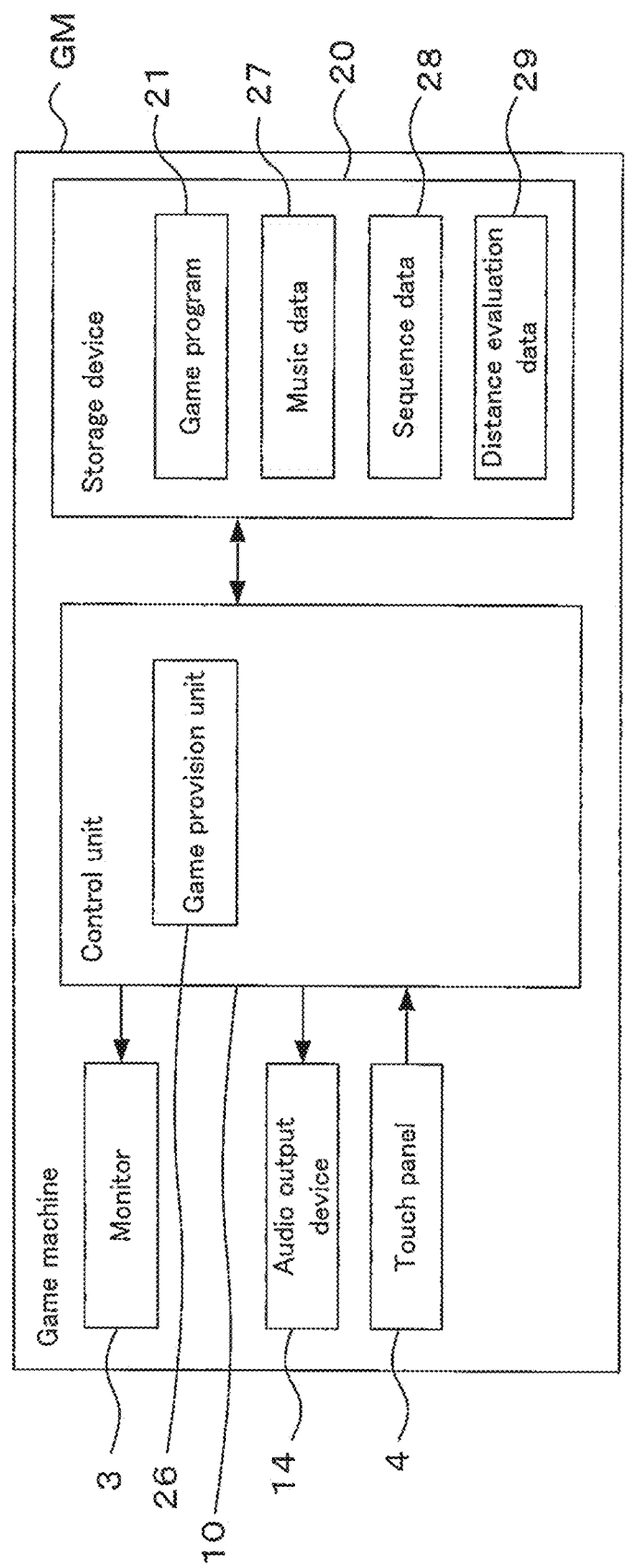
FIG. 2 is a figure showing the structure of principal portions of the game machine.

Next, the structure of principal portions of the game machine GM related to its control system will be explained with reference to FIG. 2. FIG. 2 is a figure showing the structure of principal portions of the game machine GM. As shown in FIG. 2, the game machine GM comprises a control unit 10 and a storage device 20. The control unit 10 is built as a computer unit in which a microprocessor and peripheral devices of various types required for the operation of this microprocessor, such as internal storage devices (for example, ROM and RAM) and so on, are combined.

In addition to the monitor 3 and the touch panel 4 described above, for example, an audio output device 14 is also connected to the control unit 10. The monitor 3 displays a game screen or the like on the basis of an image signal outputted from the control unit 10. The touch panel 4 outputs a signal to the control unit 10 corresponding to touch operation by the player P. And, on the basis of an audio reproduction signal outputted from the control unit 10, the audio output device 14 reproduces and outputs predetermined audio (including music or the like).

Moreover, a storage device 20 is connected to the control unit 10. This storage device 20 is built as an optical storage medium such as, for example, a DVD ROM or a CD ROM or the like, or as a non-volatile semiconductor memory device or the like such as an EEPROM or the like, so as to be capable of maintaining storage even without any supply of electrical power. A game program 21 is stored in the storage device 20. This game program 21 is a computer program that is required by the game machine GM in order for a game to be provided. By the control unit 10 reading in and executing the game program 21, a game provision unit 26 is constituted in the interior of the control unit 10.

This game provision unit 26 performs processing of various types in connection with playing of the game on the game machine GM, such as managing the start of the game, its progression, and its ending, and collection of a playing charge (i.e. of the predetermined game payment). The game provision unit 26 is a logical device that is implemented by a combination of computer hardware and a computer program. It should be understood that logical devices of various other types may also be provided in the interior of the control unit 10, but these are not shown in the figures.

Furthermore, data of various types is stored in the storage device 20, and can be referred to during the execution of the game program 21. This data of various types includes, for example, image data for displaying images of objects of various types during the game, sound effect data for reproducing sound effects of various types during the game, music data 27 for reproducing pieces of music during provision of a music game, and so on. Furthermore, this data of various types includes sequence data 28 serving as reference timing data, and distance evaluation data 29. The details of this sequence data 28 and of this distance evaluation data 29 will be described hereinafter.

Next, the music game provided by the game machine GM will be explained. As described above, this music game is a game that requests the player to perform predetermined play actions in time with the rhythm of music. The game machine GM provides a music game that employs touch operation, in which a touch panel is touched in order to specify positions upon a game screen, for predetermined play actions of this type. Moreover, for example, this music game is constructed so as to teach timings at which touch operations should be executed by arranging objects serving as indication marks corresponding to the timings at which touch operations should be executed in order of time along a predetermined path from reference lines serving as reference marks corresponding to the present time, and by shifting the objects so as to arrive at the timings at which touch operations should be executed at the reference lines within the game region serving as a predetermined range according to the lapse of time.

In more concrete terms, as one example, the music game supplied by the game machine GM is constructed so that, the objects shift between a plurality of reference lines that are arranged with mutual gaps being present between them in the game region, and the path of shifting of the object going to the next reference line also changes according to touch operation by the player. Moreover, for example, as the game region, a game region may be utilized that is formed as rectangular, with the reference lines being arranged near each side thereof. And the player is requested to perform appropriate touch operations upon this object, matched to its arrival at the reference lines. Furthermore, for example, the time gaps between the timings at which these touch operations are actually performed and the timings at which these touch operations ought to have been performed are evaluated. Yet further, these evaluations are higher, the smaller the time gaps are. As one example, the game machine GM may supply a music game of this type. It should be understood that there is no need for the arrivals of the object at all the reference lines to be evaluated. For example, this music game may be constructed so that arrival at a specified one of the plurality of reference lines is evaluated. In this case, the specified reference line to be evaluated functions as the "reference mark" of the Claims, while the other reference lines function as the "reference portion" of the Claims.

Figure 3:
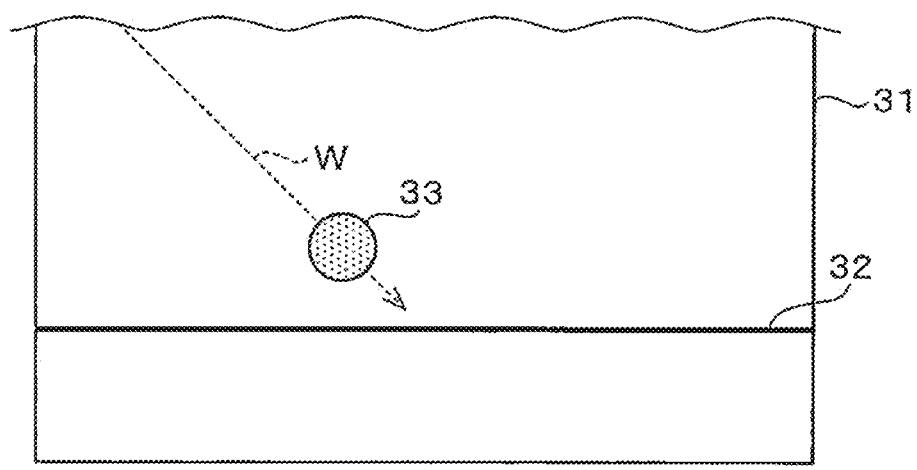
FIG. 3 is a figure showing an example of a game region displayed upon a monitor.
Figure 4:
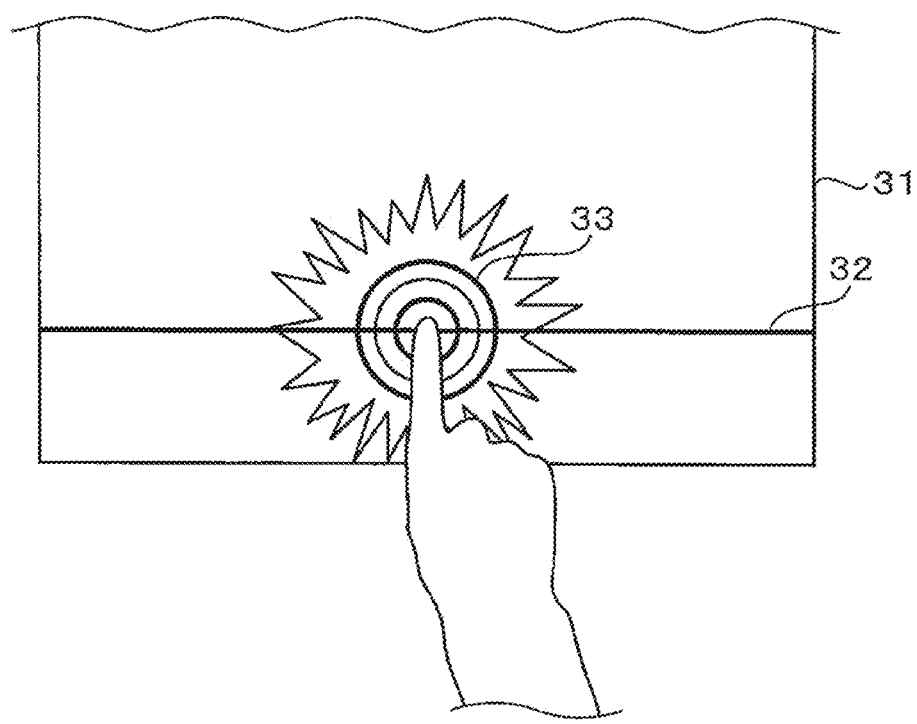
FIG. 4 is an explanatory figure for explanation of an example of normal touch operation.
Figure 5:
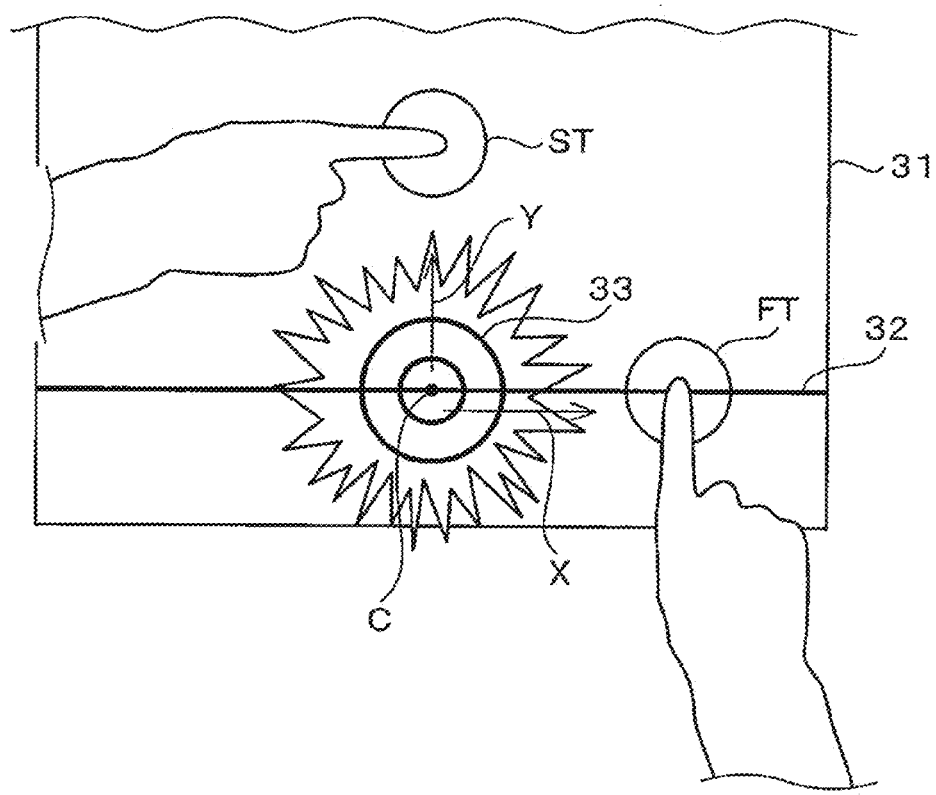
FIG. 5 is an explanatory figure for explanation of an example of special touch operation.

Now, further details of the music game provided by the game machine GM will be explained with reference to FIGS. 3 through 5. FIG. 3 is a figure showing an example of a game region that is displayed upon the monitor 3. Moreover, FIG. 3 shows a portion of the game region; in more concrete terms, it shows the neighborhood of a reference line. As shown in FIG. 3, an object 33 that shifts towards the reference line 32 is disposed within the game region 31. In more concrete terms, the object 33 shifts along a path of shifting W within the game region 31, so as to arrive at the reference line 32 at a timing at which a touch operation must be performed. And the player is requested to perform some appropriate touch operation with respect to the object 33, matched with the arrival of the object 33 at the reference line 32.

As one example, this appropriate touch operation may include two possible operations: a normal touch operation which serves as a normal play action, and a special touch operation which serves as a special play action. For example, touch operation in which the position of the object 33 is touched may be employed as the normal touch operation. FIG. 4 is an explanatory figure for explanation of an example of this normal touch operation. Moreover, FIG. 4 shows a situation in which normal touch operation is being executed at an appropriate timing. If, as shown in FIG. 4, touch operation in which the position of the object 33 is touched is employed as normal touch operation, then the position of the object 33 itself is touched by the player, this action being matched with the arrival of the object 33 at the reference line 32. In other words, an operation of touching at a single position that corresponds to this object 33 is performed. And the time gap between the timing at which this touch operation is performed and the timing at which this touch operation should have been performed is evaluated.

On the other hand, for example, as the special touch operation, there is employed a touch operation that does not consist of simply touching upon the position of the object 33, but that can be handled in a similar manner to the aforementioned touch operation upon the position of the object 33. As this type of special touch operation, for example, touch operation upon two locations whose positions are different from the position of the object 33 in the horizontal direction and in the vertical direction respectively may be employed. FIG. 5 is an explanatory figure for explanation of an example of such special touch operation. Moreover, FIG. 5 shows a situation in which this special touch operation is being executed at an appropriate timing. When the operation of touching upon two locations is employed as the special touch operation as shown in FIG. 5, then, if a particular position that is obtained according to this touch operation upon two locations agrees with the position of the object 33, this is considered as being touch operation upon the object 33. In more concrete terms, the position of intersection of the two extended lines drawn from the positions of the touch operations and respectively extended in the horizontal direction X which is parallel to the reference line 32 and in the vertical direction Y which is orthogonal to the horizontal direction X is utilized as the particular position. In other words, a position that is different from both of the positions where touch operation has been performed is employed as the particular position. In the example of FIG. 5, touch operations upon two locations, i.e., with reference to the position C of the center of the object 33, upon a first position FT that is displaced therefrom along the horizontal direction X, in other words along the direction of the reference line 32, and upon a second position ST that is displaced therefrom along the vertical direction Y, in other words along the direction orthogonal to the reference line 32, are handled in a similar manner to touch operation upon the position of the object 33. Moreover, this first position FT and this second position ST function as the "specified positions" of the Claims.

Figure 6:
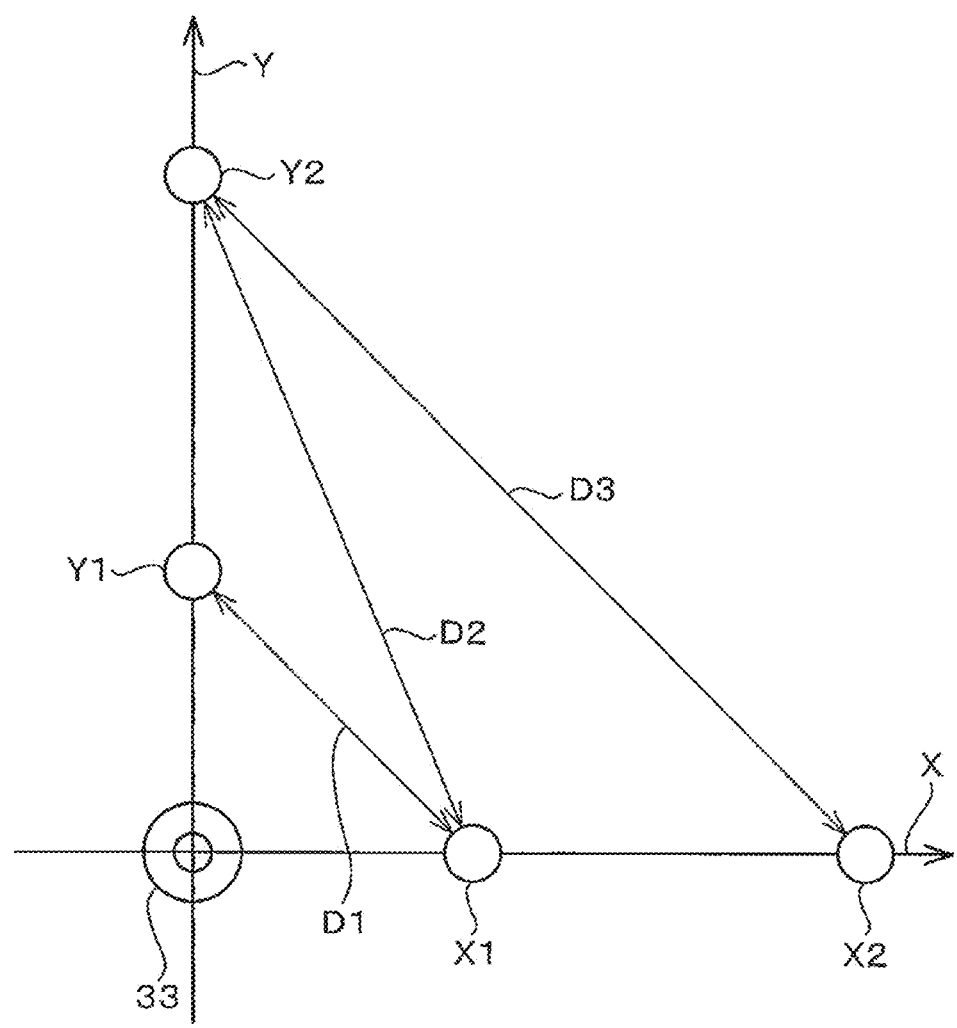
FIG. 6 is an explanatory figure for explanation of the details of a special touch operation in which two locations are touched.

FIG. 6 is an explanatory figure for explanation of the details of this special touch operation in which two locations are touched. FIG. 6 shows, by way of example, three different special touch operations that can be generated as combinations of positions in the horizontal direction X and in the vertical direction Y. In concrete terms, the example of FIG. 6 shows a first special touch operation that consists of a combination of a first touch position X1 in the horizontal direction and a first touch position Y1 in the vertical direction, a second special touch operation that consists of a combination of the above first touch position X1 in the horizontal direction and a second touch position Y2 in the vertical direction, and a third special touch operation that consists of a combination of a second touch position X2 in the horizontal direction and the above second touch position Y2 in the vertical direction. As shown in FIG. 6, both the first touch position X1 in the horizontal direction and the second touch position X2 in the horizontal direction are separated from the object 33 in the horizontal direction. On the other hand, both the first touch position Y1 in the vertical direction and the second touch position Y2 in the vertical direction are separated from the object 33 in the vertical direction. Accordingly, the particular position obtained by any of the first special touch operation through the third special touch operation will agree with the position of the object 33. In other words, any one of this first special touch operation, this second special touch operation, and this third special touch operation is evaluated as being an appropriate touch operation, just like the normal touch operation.

Furthermore, the second touch position X2 in the horizontal direction is further than the first touch position X1 in the horizontal direction in the horizontal direction X from the object 33. In a similar manner, the second touch position Y2 in the vertical direction is also further than the first touch position Y1 in the vertical direction in the vertical direction Y from the object 33. Moreover, in the example of FIG. 6, the distance of the first touch position X1 in the horizontal direction from the object 33 in relation to the horizontal direction X and the distance of the first touch position Y1 in the vertical direction from the object 33 in relation to the vertical direction Y are approximately the same. On the other hand, the distance of the second touch position Y2 in the vertical direction from the object 33 in relation to the vertical direction Y is greater than the distance of the first touch position X1 in the horizontal direction from the object 33 in relation to the horizontal direction X. In other words, the distances from the object 33 of the first touch position X1 in the horizontal direction and the second touch position Y2 in the vertical direction are mutually different from one another. That is to say, a combination like this in which the distances from the object 33 are different is also evaluated as a special touch operation, in a similar manner to normal touch operation.

The special touch operation is evaluated higher, the further the positions at which touching has been performed are from the object 33. In the example of FIG. 6, the second gap D2 between the first touch position X1 in the horizontal direction and the second touch position Y2 in the vertical direction is larger than the first gap D1 between the first touch position X1 in the horizontal direction and the first touch position Y1 in the vertical direction. Accordingly, the evaluation of the second special touch operation is higher than the evaluation of the first special touch operation. Moreover, the third gap D3 between the second touch position X2 in the horizontal direction and the second touch position Y2 in the vertical direction is larger than the second gap D2. Accordingly, the evaluation of the third special touch operation is higher than the evaluation of the second special touch operation. The first gap D1, the second gap D2, and the third gap D3 are all distances between the corresponding touch positions upon straight lines drawn between them. In other words, in order to correspond to the length of the distances between the two positions of touching, the evaluations of these special touch operations are high in the order: the first special touch operation, the second special touch operation, and the third special touch operation.

Furthermore, if touch operations are performed at two or more positions, then the positions at which these touch operations are performed are not themselves evaluated. In other words, if a special touch operation has been performed, then, instead of normal touch operation, this special touch operation is evaluated. As a result, only one or the other of a normal touch operation and a special touch operation is evaluated. Accordingly, the player must selectively execute one or the other of normal touch operation and special touch operation. Moreover, the result of evaluation of a special touch operation is always higher than that of a normal touch operation, irrespective of the distance between the positions of touching. In other words, performing special touch operation is beneficial in terms of the result of the game. Accordingly, the player will perform a special touch operation when he wishes to obtain a higher evaluation. And a player who wishes to obtain an even higher evaluation will perform a touch operation upon two locations that are more separated from the object 33. A music game is provided by the game machine GM that is capable of utilizing either of two types of touch operation in this manner, as appropriate.

Next, the details of sequence data 28 and distance evaluation data 29 will be explained. The sequence data 28 is data for defining the timings at which appropriate touch operations are to be performed. In more concrete terms, in the sequence data 28, as reference timings, timings at which appropriate touch operations must be performed are defined by timings in the music. Accordingly, the timings that are described in the sequence data 28 are used as timings for the object 33 to arrive at the reference line 32 during the music game. It should be understood that the sequence data 28 is prepared to correspond to the type or to the level of difficulty of the music.

Figure 7:
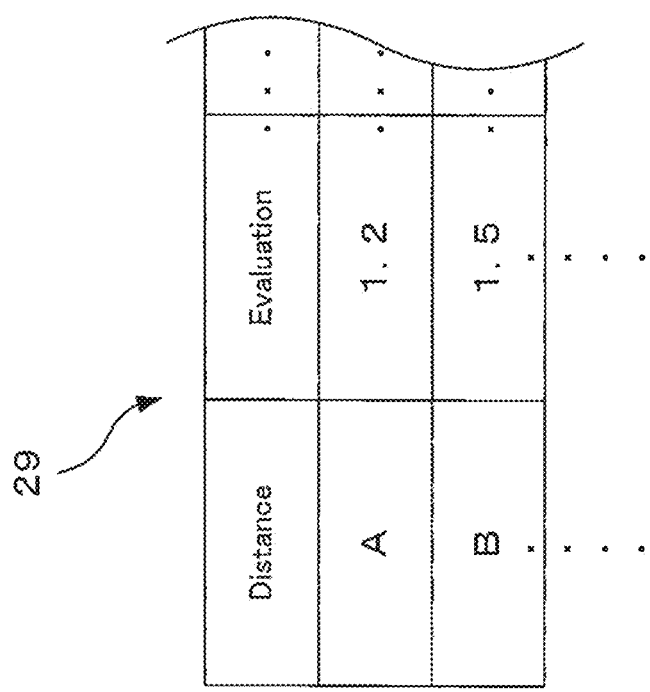
FIG. 7 is a figure showing an example of contents of distance evaluation data.

Moreover, the distance evaluation data 29 is used in order to determine the results of evaluating special touch operations. In more concrete terms, in this distance evaluation data 29, the results of evaluation according to the distance between the positions of touch operations performed at two locations as a special touch operation are defined. FIG. 7 is a figure showing an example of the contents of the distance evaluation data 29. As shown in FIG. 7, the distance evaluation data 29 includes information of distance and evaluation. The distance evaluation data 29 is a set of records in which pairs of these items of information are stored in mutual correspondence.

The distance is information indicating distances between touch operation positions at two locations where touch operations are performed as special touch operation. Information indicating a fixed range of distance, which is defined from a lower limit distance to an upper limit distance, is employed as information of the distance. And the evaluation is information indicating the results of evaluation. In other words, as the evaluation, evaluation information is recorded that is to be applied when an operation is performed whose distance corresponds to that evaluation. As one example, in FIG. 7, "A" and "B" are given as items of distance information. For example, "A" may correspond to a distance range of "10 mm~30 mm", while "B" corresponds to a distance range of "31 mm~60 mm". On the other hand, the evaluation information items of "1.2" and "1.5" are recorded in correspondence with these distance information items. For example, in this case, "1.2" indicates a multiplication factor when the evaluation of the normal touch operation is used as standard and symbolized by "1". In other words, in the example of FIG. 7, the information of the distance and the evaluation is recorded, such as information that 1.2 times as much evaluation as the evaluation of the normal touch operation is obtained when a distance between 2 touch positions is "10 mm~30 mm" corresponding to "A". In this manner, the distance evaluation data 29 is data for dividing distance between the two positions of touch operations which have been performed as special touch operation into subdivisions each constant range, and for defining an evaluation result for each of these subdivisions.

Next, touch discrimination processing and special touch evaluation processing will be explained. The abovementioned touch discrimination processing is executed in order to tell the difference between normal touch operation and special touch operation. On the other hand, the abovementioned special touch evaluation processing is executed in order to evaluate a special touch operation. This touch discrimination processing and special touch evaluation processing may, for example, be executed by the control unit 10 via the game provision unit 26. It should be understood that although, apart from the above processing, the control unit 10 also executes, via the game provision unit 26, per se known processing of various other types required in order to provide the music game, such as, for example, processing for making the object shift within the game region 31 in an appropriate manner and normal touch evaluation processing for evaluation of normal touch operations, detailed explanation of those other types of processing will be omitted.

Figure 8:
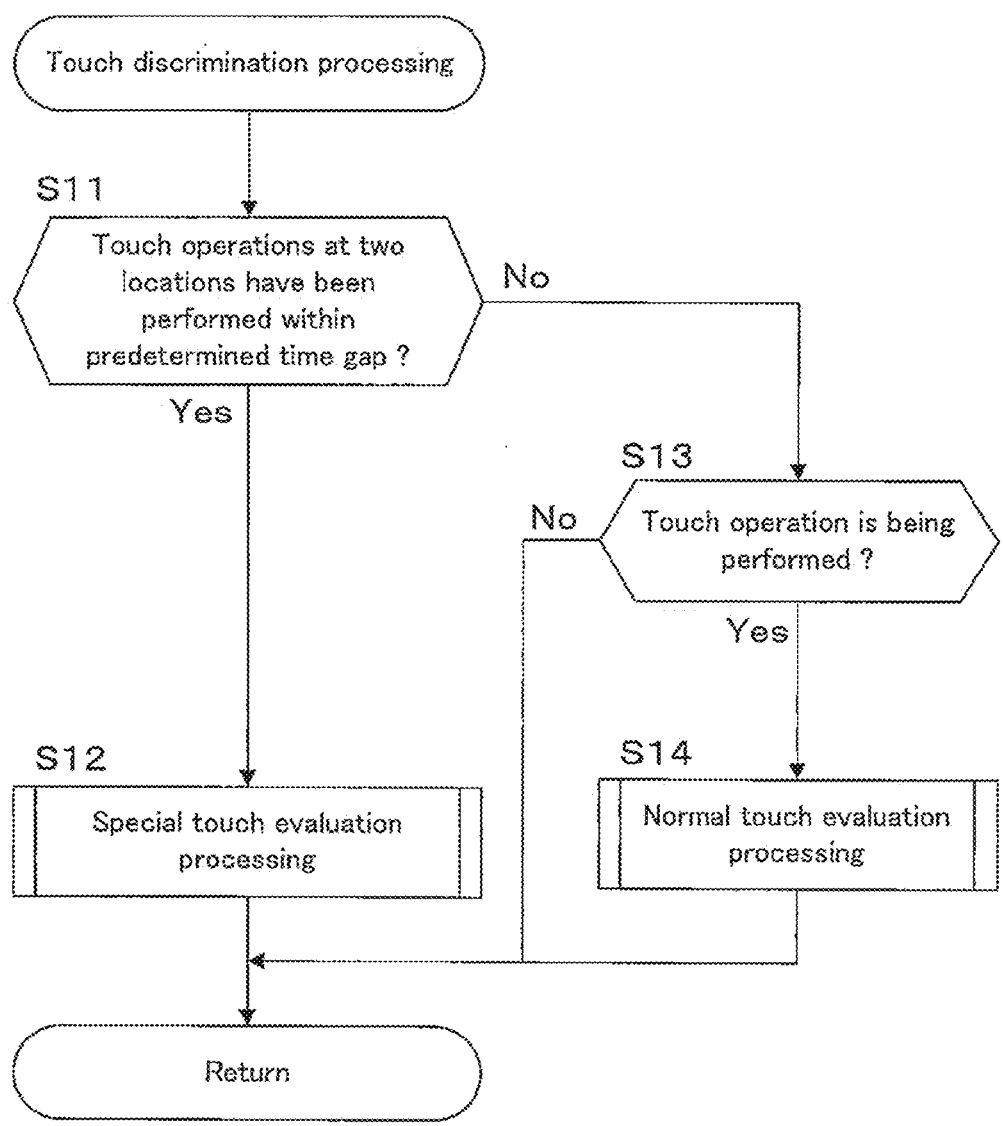
FIG. 8 is a figure showing an example of a flow chart for a touch discrimination processing routine.

FIG. 8 is a figure showing an example of a flow chart of a routine for this touch discrimination processing. During the game, for example, the routine of FIG. 8 is repeatedly executed on a predetermined cycle. When the routine of FIG. 8 starts, in a first step S11, the game provision unit 26 determines whether or not touch operations at two locations have been performed within a predetermined time gap, in other words whether or not touch operation that is intended to be special touch operation has been performed. If the result of this determination is affirmative, in other words if touch operations have been performed at two locations within the predetermined time gap, then the game provision unit 26 proceeds to a step S12. And in this step S12 the game provision unit 26 executes special touch evaluation processing, and then terminates this cycle of the routine.

On the other hand, if the result of the determination in the step S11 is negative, in other words if touch operations at two locations have not been performed within the predetermined time gap, then the game provision unit 26 transfers control to a step S13. And in this step S13 the game provision unit 26 determines whether or not touch operation is being performed. If the result of this determination is negative, in other words if touch operation is not being performed, then the game provision unit 26 skips the subsequent processing, and terminates this cycle of the routine.

On the other hand, if the result of the determination in the step S13 is affirmative, in other words if touch operation is being performed, then the game provision unit 26 proceeds to a step S14. In the step S13, when touch operation has been performed at one position or when touch operation is only performed at a single position within a predetermined time gap, the game provision unit 26 determines as a touch operation has been performed. Accordingly, in the next step S14, the game provision unit 26 performs normal touch evaluation processing, and then terminates this cycle of the routine. Due to this, normal touch evaluation processing is executed if normal touch operation has been performed, while on the other hand special touch evaluation processing is executed if special touch operation has been performed. In other words, due to this routine of FIG. 8, either normal touch evaluation processing or special touch evaluation processing is selectively executed, and evaluation is performed for one or the other of normal touch operation and special touch operation. It should be understood that, since as described above the normal touch evaluation processing may be executed by per se known processing, accordingly detailed explanation thereof will be omitted.

FIG. 9 is a figure showing an example of a flow chart for a routine for the above described special touch evaluation processing. For example, the routine of FIG. 9 may be called and executed in the step S12 of the routine of FIG. 8. When the routine of FIG. 9 starts, in a first step S21, the game provision unit 26 calculates the particular position that corresponds to the touch operations that have been performed at two locations. In concrete terms, the game provision unit 26 prolongs the positions of the touch operations in the vertical direction Y and in the horizontal direction X, and calculates the position where these prolongations intersect as being the particular position. It should be understood that, since two locations are calculated as particular positions, accordingly, in the following, both of these two locations may be utilized as particular positions. And, among the particular positions in two locations, the one that satisfies a required condition for processing is utilized in the subsequent processing as the particular position. Moreover, the present invention is not limited to this form in which the particular position is acquired by calculation. It would also be acceptable for a table to be prepared in advance from which the particular positions can be acquired, and to acquire the particular position from this table.

In the next step S22, the game provision unit 26 determines whether or not the particular position calculated in the step S21 is within a predetermined region with reference to the reference line 32. A region that can be determined as being upon the reference line 32 is employed as the predetermined region. In other words, a region that is within a predetermined distance in the vertical direction Y from the reference line 32 is employed as the predetermined region. And if the result of this determination is negative, in other words if the particular position is not positioned within the predetermined region, then the game provision unit 26 skips the subsequent processing, and terminates this cycle of the routine.

On the other hand, if the result of the determination in the step S22 is affirmative, in other words if the particular position calculated in the step S21 is positioned within the predetermined region, then the game provision unit 26 proceeds to a step S23. In this step S23, the game provision unit 26 determines the reference line 32 that is positioned within a predetermined distance from the particular position that was calculated in the step S21 and the timing, in the sequence data 28 related to this reference line 32, which is the closest at timing at which the two touch operations have been performed.

In the next step S24, the game provision unit 26 acquires the time gap between the timing specified in the step S23 and the timing of the later one of the touch operations upon the two locations. And next in a step S25 the game provision unit 26 determines whether or not the time gap acquired in the step S24 is within an evaluation range. This determination may, for example, be implemented by determining to which of a plurality of levels that have been set within the evaluation range the timing of the later one of the touch operations belongs. Moreover, this plurality of levels is set so as to subdivide the evaluation range into intervals of a fixed length. In more concrete terms, so that the timing defined in the sequence data 28 is located at its center, the plurality of levels in the evaluation range are set by subdividing earlier and later timings into fixed intervals. And the timing of that touch operation that is the later is evaluated as higher, the closer to the timing of the center is the subdivision to which it belongs. If the result of this determination is negative, in other words if the one of the touch operations that is the later is not performed within the evaluation range, then the game provision unit 26 skips the subsequent processing and terminates this cycle of the routine.

On the other hand, if the result of the determination in the step S25 is affirmative, in other words if the one of the touch operations that is the later is performed within the evaluation range, then the game provision unit 26 proceeds to a step S26. In this step S26, the game provision unit 26 acquires the deviation between the particular position that was calculated in the step S21 and the position of the object 33. And in the next step S27 the game provision unit 26 determines whether or not the position deviation acquired in the step S26 is within an evaluation range. As this evaluation range, for example, a range within a constant distance from the external periphery of the object 33 may be set. In other words, in the step S27, the game provision unit 26 determines whether or not the position deviation is included within this constant distance from the external periphery of the object 33. If the result of this determination is negative, in other words if the position deviation is not included within this constant distance from the external periphery of the object 33, then the game provision unit 26 skips the subsequent processing and terminates this cycle of the routine.

On the other hand, if the result of the determination in the step S27 is affirmative, in other words if the position deviation is included within the constant distance from the external periphery of the object 33, then the game provision unit 26 proceeds to a step S28. In this step S28, the game provision unit 26 calculates the distance between the two locations at which touch operation was performed. For this distance, for example, the shortest distance between the positions of the two locations of touch operation (i.e. when they are joined by a straight line) may be used.

In the next step S29, the game provision unit 26 determines an evaluation on the basis of the distance that was calculated in the step S28. This evaluation, for example, may be determined on the basis of the distance evaluation data 29. In concrete terms, first, the game provision unit 26 specifies to which distance range of the distance evaluation data 29 the distance that was calculated in the step S28 belongs. And this evaluation corresponding to the specified distance range is determined as being the evaluation for the special touch operation this time. The game provision unit 26 performs the evaluation in the step S29 by doing the above. When the processing of the step S29 has been completed, the game provision unit 26 terminates this cycle of the routine. Moreover, the result of evaluation determined by this processing is displayed upon the monitor 3. Due to this, the touch operation at two locations is evaluated in a similar manner to that for normal touch operation. Furthermore, the greater is the distance between the positions of touching at the two locations, the higher is the evaluation arrived at on the basis of the distance evaluation data 29. Yet further, according to the routines of FIG. 8 and FIG. 9, when touch operation at two locations has been performed, the particular position that is obtained according to these two locations is used as the subject for evaluation, while the positions of the touch operations themselves are not evaluated. In other words, according to these routines, if touch operation is performed at two locations, then this is taken as being special touch operation and not as being normal touch operation, and only the particular position is evaluated As has been explained above, according to this embodiment, not only are normal touch operations evaluated, but also special touch operations are evaluated. In a special touch operation, the relationship between the positions (two locations) at which the special touch operation has been performed and the particular position which becomes the subject of evaluation is not as clear as in the case of normal touch operation. Accordingly, the level of difficulty of special touch operation is higher as compared to that of normal touch operation. In other words, it is possible to enhance the level of difficulty of this music game by evaluation of special touch operations. Due to this, it is possible to enhance the level of interest of the music game without changing the contents of the game.

Furthermore, since both special touch operation and normal touch operation are evaluated, accordingly it is possible for the player to use either of these, as appropriate. Due to this, the options available to the player are increased. Moreover, in special touch operation, the evaluation changes according to the distance between the two locations. In other words, the player is able himself to select special touch operation at a distance at which he can perform it. Due to this, it is possible to increase the variety available for the play actions. Yet further, the evaluation of a special touch operation is higher, the greater the distance by which the two locations are separated. Due to this, it is possible to reflect the level of difficulty of the special touch operation in the result of its evaluation.

In the embodiment described above, by executing the routine of FIG. 8 via the game provision unit 26, the control unit 10 functions as the "particular position acquisition device" and as the "position evaluation device" of the Claims. Moreover, by using the music data 27 and so on, and by outputting the reproduced audio signal to the audio output device 14, the control unit 10 also functions as the "music reproduction device" of the Claims.

The present invention is not to be considered as being limited to the embodiment described above; it may be implemented in various suitable ways. In the embodiment described above, in the music game, the player was able to use either normal touch operation or special touch operation, as appropriate. However, the present invention is not limited to this manner of operation. For example, it would be possible for normal touch operation and special touch operation to be specified by the music game. Moreover, this type of specification may, for example, be performed by changing the format of the object. In this case, it would be possible to specify use of either normal touch operation or special touch operation, as appropriate. Yet further, due to this, it would also be possible to evaluate the appropriateness of this choice. Furthermore, the present invention is not limited to normal touch operation and special touch operation being determined according to the format of the object. The specification of normal touch operation and special touch operation may be implemented in various ways, provided that they can be distinguished from one another.

In the embodiment described above, both normal touch operation and special touch operation were evaluated. However, the present invention is not limited to this form. For example, it would also be acceptable for normal touch operation not to be evaluated at all, but for only special touch operation to be evaluated. By doing this, it is possible to provide a music game that has a yet higher level of difficulty.

In the embodiment described above, as special touch operation, touch operation at two locations was employed. However, the present invention is not to be considered as being limited to this form. For example it would also be acceptable, as special touch operation, to employ touch operation at a plurality of positions three or more. In this case, for example, the particular position may be acquired on the basis of the averages of the positions of the touch operation positions in the vertical direction and of their positions in the horizontal direction. Accordingly, provided that the particular position is acquired by taking a plurality of touch operation positions as reference, it will be acceptable to employ any type of position as the particular position.

In the embodiment described above, touch operation was detected as the predetermined play action via the touch panel 4. However, the present invention is not to be considered as being limited to this form. Actions of various types specifying a position within the game region may be employed as play actions; they are not limited to being touch operations. For example, a motion of specifying a position could be employed as a play action of this type. In this case, for example, it would be possible to employ an optical sensor such as a camera or the like as a specified position detection device. Moreover while, in the embodiment described above, it was arranged to perform evaluation by using the timing that the object arrived at the reference line 32, and the timing that it was detected that the predetermined play action was performed, this is not to be considered as being limitative. For example, it would also be acceptable to arrange to apply the present invention to a game in which a predetermined play action is requested at a timing at which two or more objects that are shifting within the game region come to overlap one another. In this case, it would be possible to arrange for the subjects that are evaluated to be whether or not the position at which the two or more objects within the game region come to overlap one another generally agrees with the intersection position upon the vertical axis and the horizontal axis of the touch operations performed at the two locations, and the timing of touch operation.

In the embodiment described above, the game machine GM supplied a music game. However, the game supplied by the game machine is not limited to being a music game. Games of various types, such as an action game, a sports game, or the like, may be provided by the game machine, provided that they are games in which play actions are evaluated (preferably, games in which timings at which play actions are to be performed are commanded, and the timings of the actual play actions are evaluated on the basis of those timings). Moreover, the game machine of the present invention may be implemented in any appropriate form, such as a game machine for business that is installed in a commercial facility, a home game machine for household use, a portable type game machine, a game machine that uses the internet, or the like.

What is claimed is:

1. A game machine that provides a game in which a predetermined play action is evaluated, and wherein the game machine comprises:
   a storage device configured to store game play data and a game program utilized by the game machine in providing the game;
   a game provision unit, provided in part by a control unit, configured to read and execute the game program, the game provisional unit being configured to manage initiation, progression, and termination of the game and collection of a playing charge;
   a monitor coupled to the game provision unit;
   an audio output device configured to reproduce and output music,
   a music reproduction device configured to reproduce the music from the audio output device on the basis of music data for reproducing the music; and wherein timings within the music are used as the reference timings, wherein the game provision unit is configured to serve as a particular position acquisition device and a position evaluation device; and,
   a specified position detection device being configured to, when a plurality of positions within a predetermined range have been specified as the predetermined play action, detect the plurality of specified positions that have been specified by the play action, the particular position acquisition device being configured to, on the basis of the results detected by the specified position detection device, acquire a particular position that is different from all of the plurality of specified positions by using the plurality of specified positions as reference and the position evaluation device being configured to, on the basis of the result of acquisition by the particular position acquisition device, evaluate the particular position as the predetermined play action, wherein, as the game, a game is employed that teaches reference timings to a player by, based upon reference timing data in which the reference timings at which the predetermined play actions are to be executed are described, arranging indication marks corresponding to the reference timings and a reference mark corresponding to the present time in order of time along a predetermined path, and by generating relative displacement along the predetermined path between the indication marks and the reference mark according to the passage of time, so that the indication marks agree with the reference mark at the reference timings to be shown by the indication marks.

2. A game machine according to claim 1, wherein, in the game, when the particular position is evaluated by the position evaluation device, evaluation for the plurality of specified positions is not performed.

3. A game machine according to claim 1, wherein:
a normal play action in which one position within the predetermined range is specified, and a special play action in which the plurality of positions are specified, are included in the predetermined play action; and
the position evaluation device evaluates either one of the one position and the particular position by evaluating the one position when the normal play action has been performed, while by evaluating the particular position instead of evaluating the one position when the special play action has been performed.

4. A game machine according to claim 3, wherein, in the game, the normal play action and the special play action are specified, to the player, in a manner that can be mutually distinguished.

5. A game machine according to claim 1, wherein the position evaluation device evaluates the particular position as a function of a distance of a straight line defined by the plurality of specified positions.

6. A game machine according to claim 1, wherein:
the game is constructed so that a reference portion, at which the indication mark shifting within the game region in which the plurality of reference portions are arranged with mutual gaps being opened between them so as to arrive at least at one of the plurality of the reference portions at the reference timing that corresponds to the indication mark has arrived, functions as the reference mark, and the shifting path of the indication mark going to the next reference portion changes according to the play action; and
the relative displacement is generated by the indication mark shifting towards the reference marks.

7. A game machine according to claim 1, wherein the position evaluation device evaluates the particular position by taking the position of the indication mark as reference, and also evaluates the timing at which the play action has been executed on the basis of the reference timing data.

8. A gaming machine according to claim 1, wherein the specified position detecting device is configured to detect one or more specified positions relative to the monitor in response to player action.

9. A gaming machine according to claim 8, wherein the specified position detecting device includes a transparent touch panel superimposed on a front surface of the monitor.

10. A gaming machine according to claim 8, wherein the specified position detection device includes an optical sensor configured to detect the player motion.

11. A control method of controlling a game machine that provides a game in which a predetermined play action is evaluated, the game machine including a storage device, a game provision unit, a monitor, an audio output device, a music reproduction device and a specified position detection device, the storage device being configured to store game play data and a game program utilized by the game machine in providing the game, the game provision unit, provided in part by a control unit, being configured to read and execute the game program, the game provisional unit being configured to manage initiation, progression, and termination of the game and collection of a playing charge, the monitor being coupled to the game provision unit, the audio output device being configured to reproduce and output music, the music reproduction device configured to reproduce the music from the audio output device on the basis of music data for reproducing the music; and wherein timings within the music are used as the reference timings, wherein the game provision unit is configured to serve as a particular position acquisition device and a position evaluation device, where the specified position detection device is configured to, when a plurality of positions within a predetermined range have been specified as the predetermined play action, detect the plurality of specified positions that have been specified by the play action, and wherein the control method comprises:
a particular position acquisition step that, on the basis of the results detected by the specified position detection device, acquires a particular position that is different from all of the plurality of specified positions by using the plurality of specified positions as reference; and
a position evaluation step that, on the basis of the result of acquisition by the particular position acquisition step, evaluates the particular position as the predetermined play action, wherein, as the game, a game is employed that teaches reference timings to a player by, based upon reference timing data in which the reference timings at which the predetermined play actions are to be executed are described, arranging indication marks corresponding to the reference timings and a reference mark corresponding to the present time in order of time along a predetermined path, and by generating relative displacement along the predetermined path between the indication marks and the reference mark according to the passage of time, so that the indication marks agree with the reference mark at the reference timings to be shown by the indication marks.

12. A non-transitory computer readable storage medium storing a computer program for a game machine that provides a game in which a predetermined play action is evaluated, and wherein the computer program for the game machine is configured so as to cause the game machine to function as:
a storage device configured to store game play data and a game program utilized by the game machine in providing the game;
a game provision unit, provided in part by a control unit, configured to read and execute the game program, the game provisional unit being configured to manage initiation, progression, and termination of the game and collection of a playing charge;

a monitor coupled to the game provision unit;

an audio output device configured to reproduce and output music, and a music reproduction device configured to reproduce the music from the audio output device on the basis of music data for reproducing the music; and wherein timings within the music are used as the reference timings, wherein the game provision unit is configured to serve as a particular position acquisition device and a position evaluation device; and, a specified position detection device being configured to, when a plurality of positions within a predetermined range have been specified as the predetermined play action, detect the plurality of specified positions that have been specified by the play action, the particular position acquisition device being configured to, on the basis of the results detected by the specified position detection device, acquire a particular position that is different from all of the plurality of specified positions by using the plurality of specified positions as reference and the position evaluation device being configured to, on the basis of the result of acquisition by the particular position acquisition device, evaluate the particular position as the predetermined play action, wherein, as the game, a game is employed that teaches reference timings to a player by, based upon reference timing data in which the reference timings at which the predetermined play actions are to be executed are described, arranging indication marks corresponding to the reference timings and a reference mark corresponding to the present time in order of time along a predetermined path, and by generating relative displacement along the predetermined path between the indication marks and the reference mark according to the passage of time, so that the indication marks agree with the reference mark at the reference timings to be shown by the indication marks.

* * * * *